No. 685,209.  
R. HOODLESS.  
HOE.  
(Application filed May 25, 1899. Renewed Sept. 20, 1901.)  
(No Model.)

Patented Oct. 22, 1901.

WITNESSES:  
James McCallum Jr.  
Amelia Williams

INVENTOR.  
Richard Hoodless  
BY Cyrus E. Lothrop  
ATTORNEY.

UNITED STATES PATENT OFFICE.

RICHARD HOODLESS, OF CHICAGO, ILLINOIS, ASSIGNOR TO ALEXANDER T. FISCHER, OF DETROIT, MICHIGAN.

HOE.

SPECIFICATION forming part of Letters Patent No. 685,209, dated October 22, 1901.

Application filed May 25, 1899. Renewed September 20, 1901. Serial No. 75,941. (No model.)

*To all whom it may concern:*

Be it known that I, RICHARD HOODLESS, of Chicago, in the county of Cook and State of Illinois, have invented a new and useful Improvement in Hoes, of which the following is a specification.

My invention relates to a hoe or tool especially adapted for the cultivation, weeding, and thinning of sugar-beets or other vegetables similarly grown and cultivated.

As is well known, sugar-beets are commonly sown in straight parallel rows some distance apart, the seeds being sown close together in each row for the purpose of insuring a uniform "stand," as it is termed. After the beets have attained a certain growth in the row they are "thinned" or "spaced" by removing the superfluous beets in each row, so as to leave single plants standing at uniform distances from each other in the rows, thus insuring sufficient room for the growth of the beets. During the early stages of beet cultivation frequent cultivation and weeding with a hoe or other implement adapted therefor is necessary for the success of the crop; and the object of my invention is to provide a new and improved duplex hoe adapted both for weeding and cultivating purposes and for the thinning or spacing of the beets in the rows.

This object is accomplished in the manner and by the means hereinafter described and claimed, reference being made to the accompanying drawings, in which—

Figure 1:
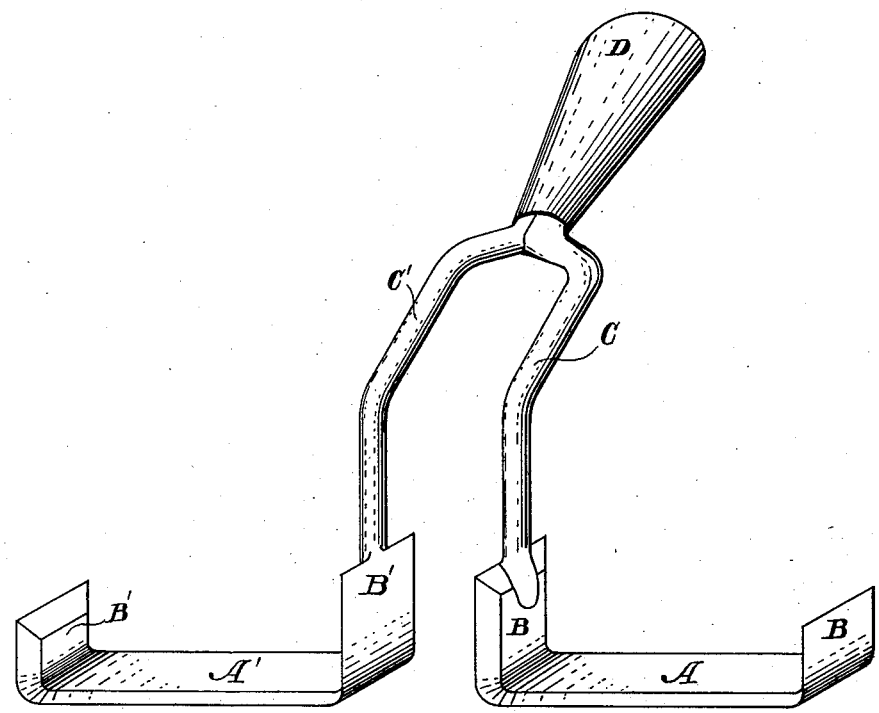
Figure 2:
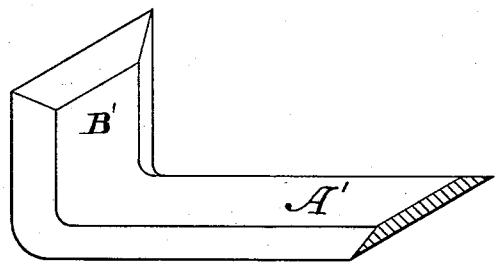

Figure 1 is a perspective view of my improved duplex hoe, omitting the handle; and Fig. 2 is a broken perspective view of a portion of one of the hoe-blades.

In the drawings the letters A A' indicate two similar flat blades, each having opposite parallel cutting edges and upturned at its ends to provide perpendicular end blades B B' at right angles to the flat horizontal blade. The two hoe-blades thus constructed are arranged in alinement in the same plane, and their inner end blades are separated such distance as to straddle a row of beets or plants. The two hoe-blades are rigidly held in fixed relation to each other by two rods C C', attached to the inner end blades B B' and secured to a handle receiving and holding socket D. The space or interval between the two parts of the implement is for the purpose of enabling the implement to be used for weeding and cultivation on either side of a row of beets without interfering with or touching the plants themselves. The length of the horizontal blades A A' between the perpendicular end blades thereof should preferably be so regulated as to be about half the distance between the rows of beets, so that the entire spaces between the rows of beets may be cultivated and weeded without disturbing the plants themselves. The double cutting edges of the horizontal blades A A' and of the perpendicular end blades B B' B' and the attachment of the handle by the rods C C' to the top of the perpendicular sides B B' enable the operator to use the implement either by pushing the same from him or drawing it toward him, as may be desired. The implement may be used for thinning or spacing the beets by drawing or pushing the same across the rows, the blades A A' thus removing the superfluous beets and leaving the plants between the parts untouched. The opposite vertical edges of each end blade B B' are sharpened to provide perpendicular cutting edges on said end blade.

What I claim as my invention, and desire to secure by Letters Patent, is—

A duplex hoe, consisting of two separated horizontal flat blades having front and rear cutting edges and each provided at its opposite ends with vertical end blades constructed with perpendicular cutting edges, two rods attached, respectively, to the inner vertical end blades, and a handle-socket secured to said rods, substantially as described.

RICHARD HOODLESS.

Witnesses:
FRED. S. WHEAT,
W. E. WHEAT.